United States Patent [19]
Jin et al.

[11] Patent Number: 5,998,048
[45] Date of Patent: Dec. 7, 1999

[54] ARTICLE COMPRISING ANISOTROPIC CO–FE–CR–N SOFT MAGNETIC THIN FILMS

[75] Inventors: Sungho Jin, Millington; Timothy J. Klemmer, Watchung; Thomas Henry Tiefel, deceased, late of North Plainfield, by Linda J. Tiefel, administratrix; Robert Bruce Van Dover, Maplewood; Wei Zhu, Warren, all of N.J.

[73] Assignee: Lucent Technologies Inc., Murray Hill, N.J.

[21] Appl. No.: 09/033,204

[22] Filed: Mar. 2, 1998

[51] Int. Cl.$^6$ ........................................................ G11B 5/66
[52] U.S. Cl. ................................ 428/694 T; 428/694 TS; 428/694 TM; 428/900; 427/128; 427/129; 427/130; 427/131; 204/192.2
[58] Field of Search .......................... 478/694 T, 694 TS, 478/694 TM, 900; 427/128–131; 204/192.2

[56] References Cited

U.S. PATENT DOCUMENTS 5,114,800  5/1992  Shimizu ................................... 428/692

OTHER PUBLICATIONS

Charles Sullivan, Seth R. Sanders, "Microfabrication of Transformers and inductors for High Frequency Power Conversion", 1993 IEEE, , pp. 33–41.
Masato Mino, Toshiaki Yachi, Aiko Tago, Keiichi Yanagisawa and Kazuhikio Sakakibara, "A New Planar Microtransformer for Use in Micro Switchcing Converters", *IEEE Transactions on Magnetics*, vol. 28, No. 4, Jul. 1992, pp. 1969–1973.
Noriyuki Kataoka, Masami Hosokawa, Akihisa Inoue, and Tsuyoshi Masumoto, "magnetic Properties of Fe–Based Binary Crystalline Alloys Produces by Vapor Quenching", *Journal of Applied Physics*, vol. 28, No. 3, Mar. 1989, pp. L462–L464.
E. Haftek and J. A. Barnard, Microstructure and Magnetic Properties of FeTaN Films, *IEEE Transactions on Magnetics*, vol. 30,, No. 6, Nov. 1994, pp. 3915–3917.
Nobuyuki Ishiwata, Chizuko Wakabayashi, and Haruo Urai, "Soft Magnetism of High–Nitrogen–Concentration FeTaN Films", *J. Appl. Phys.* 69(8), Apr. 15, 1991, pp. 5616–5618.
Jiang–Ching Lin, Lih–Juann Chen, Chi–Jen Chen, "Effects of Nitrogen Content on the Microstructure and Magnetic Properties of FeTaN Films", *IEEE Transactions on Magnetics*, vol. 30, No. 6, Nov. 1994, pp. 3912–3914.
G. Qiu, E. Haftek and J. A. Bernard, "Magnetic Properties and Crystal Structure of High Moment FeTaN Materials For Thin–Film Recording Heads,"*J. App. Phys.* 73 (10), May 1993, pp. 6573–6575.
Book, *Magnetic Materials*, by R. S. Tebble and D. J. Craik, publisher, Wiley–Interscience, a division of John Wiley & Sons Ltd., London, New York, Sydney, Toronto 1969.
Book, *Magnetic Thin Films*, by Ronald F. Soohoo, Associate Professor, Division of Engineering and Applied Science, The California Institute of Tecnology, publisher, Harper & Row, New York, Evanston and London, 1965.
Book, *Thin Ferromagnetic Films*, by M. Prutton, publisher, Washington Butterworths, 1964.

*Primary Examiner*—Leszek Kiliman
*Attorney, Agent, or Firm*—John M. Harman

[57] ABSTRACT

The invention is embodied in an anisotropic, soft magnetic thin film article comprising a cobalt-iron-chromium-nitrogen (Co—Fe—Cr—N) alloy. The thin film is formed such that the alloy has a relatively high saturation magnetization ($4\pi M_s$), e.g., greater than approximately 8 kilogauss (kG), a relatively low coercivity ($H_c$), e.g., less than approximately 2.0 oersteds (Oe), a relatively high squareness ratio ($M_r/M_s$), e.g., greater than approximately 0.90, and a relatively high anisotropy field ($H_k$), e.g., greater than approximately 20 Oe, in an as-deposited condition or, alternatively, with a relatively low temperature treatment, e.g., below approximately 300° Celsius. The inventive films are suitable for use in electromagnetic devices, e.g., in microtransformer cores, inductor cores and in magnetic read-write heads.

21 Claims, 5 Drawing Sheets

ARTICLE COMPRISING ANISOTROPIC CO–FE–CR–N SOFT MAGNETIC THIN FILMS

BACKGROUND OF THE INVENTION

1. Field of the Invention

The invention relates to thin films of magnetically soft alloys. More particularly, the invention relates to articles comprising these alloys and methods for making such articles.

2. Description of the Related Art

Thin film soft magnetic materials are useful in modern, high-frequency, electromagnetic devices, e.g., as a field-amplifying component in the read-write head of magnetic disk memories in computers or as a core in microtransformers and inductors. Among the desired properties of these films are relatively high saturation magnetization ($4\pi M_s$), low coercivity ($H_c$), high permeability, high electrical resistivity and high corrosion resistance. Various applications of soft magnetic thin films are described, e.g., in books *Magnetic Thin Films* by R. F. Soohoo, Harper and Row, 1965; *Thin Ferromagnetic Films* by M. Prutton, Butterworth, 1964; and in articles such as C. R. Sullivan and S. R. Sanders, IEEE Trans. on Power Electronics, Proc. 24th Annual Power Electronics Specialists Conf., p. 33–40, June 1993; and T. Yachi et al., IEEE Trans. Magn. 28, 1969–1973 (1992).

Among conventional soft magnetic thin films, nickel-iron (Ni—Fe) based films such as 80% Ni-20% Fe (permalloy) are useful because of their favorable magnetic properties and zero magnetostriction characteristics. Iron-based films such as iron-tantalum (Fe—Ta), iron-zirconium (Fe—Zr) and iron-hafnium (Fe—Hf) alloys generally exhibit saturation magnetizations ($4\pi M_s$) of approximately 15–20 kilogauss (kG) as compared to approximately 10 kG for the 80% Ni permalloy films (see, e.g., N. Kataoka et al., Japanese J. Appl. Phys. 28, L462–L464, 1989, Trans. Jap. Inst. Metals 31, 429, 1990). However, iron-based films exhibit poorer soft magnetic properties and require post-deposition heat treatment.

To obtain improved soft magnetic properties, nitrogen-containing films of these iron-based alloys such as iron-tantalum-nitrogen (Fe—Ta—N) have been prepared. See, e.g., E. Haftek et al., IEEE Trans. Magn. 30, 3915–3917 (1994); N. Ishiwata et al., J. Appl. Phys. 69, 5616 (1991); J. Lin et al., IEEE Trans. Magn. 30, 3912–3914 (1994); and G. Qiu et al., J. Appl. Phys. 73, 6573 (1993). However, although desirable magnetic softness, e.g., a coercivity ($H_c$) of less than approximately 2 oersteds (Oe) (for microtransformer applications), is obtainable in these nitrogen-containing films, it is apparent from the aforementioned articles that such desirable soft magnetic properties are difficult to obtain in an as-deposited form, but are possible after post-deposition heat treatment at high temperatures.

However, such heat treatment of deposited films is an additional processing step that needs to be avoided if possible, not only from a manufacturing cost point of view but also because of the complications of having to expose various other components and materials in the devices to high temperatures. Therefore, it is desirable for the required soft magnetic properties in the films to be obtained in the as-deposited condition, or at worst, with a very low temperature heat treatment below approximately 150° Celsius.

Desirable high-frequency properties for soft magnetic films include relatively high permeability and low power loss. There are several sources of loss in ferromagnetic materials, including hysteresis loss, eddy current loss and ferromagnetic resonance (FMR) loss.

Hysteresis loss is reduced or minimized, e.g., by avoiding magnetic domain wall displacement, such as by performing alternating current (AC) operation of the magnetic films in the magnetically hard-axis so that magnetization only by spin rotation is used. Such mode of operation is accomplished most conveniently by providing a strong anisotropy ($H_k$) and a square magnetic hysteresis (M-H) loop. For example, see co-pending application Ser. No. 08/595,543, filed Feb. 2, 1996 now U.S. Pat. No. 5,780,175 and assigned to the assignee of the present invention.

Eddy current loss increases in proportion to the square of the operating frequency, and thus plays an important role in the high-frequency applications. Eddy current loss is reduced, e.g., by increasing the field penetration depth (skin depth) with relatively high electrical resistance in the magnetic material, either by using a thin film configuration or by selecting relatively high resistivity materials.

The occurrence of ferromagnetic resonance (FMR) in high-frequency ranges such as approximately 10 megahertz (MHz) or greater in most of the soft magnetic materials generally causes the magnetic permeability to drop off and the magnetic loss to increase by orders of magnitude, often spanning a frequency range from approximately 1–2 orders of magnitude. Such behavior is conventional for Ni—Zn ferrites. For example, see generally R. S. Tebble and D. J. Craik, *Magnetic Materials* (Wiley, New York, 1969), p. 598.

Ferromagnetic resonance (FMR) occurs when the frequency of the applied AC field matches the characteristic precession frequency of spins in the magnetic material. This precession frequency, fr, is determined by the total anisotropy field ($H_k$) experienced by the spins. For a thin film, for which the demagnetizing field ($H_d$) along the z direction is approximately equal to the saturation magnetization ($4\pi M_s$), the FMR frequency is expressed as $$f_r = 2\pi\gamma \cdot (H_k \cdot 4\pi M_s)^{1/2},$$

where $\gamma$ is the gyromagnetic constant ($2\pi\gamma = 2.8$ MHz/Oe), and $H_k$ is the in-plane anisotropy field. This relation applies for the case when the AC field is applied in the plane of the film perpendicular to the easy-axis. In order to raise the FMR frequency so that ferromagnetic resonance does not interfere with the high-frequency operation of the magnetic materials, a higher anisotropy field ($H_k$) and higher saturation magnetization ($4\pi M_s$) are needed. Typically, values of the anisotropy field ($H_k$) up to approximately 10–15 oersteds (Oe) are obtainable, but anisotropy fields ($H_k$) higher than 15 Oe in soft magnetic films generally are difficult to obtain. However, in high-frequency applications such as in wireless cellular communications, magnetic films with FMR frequencies of at least approximately 1 gigahertz (GHz) are desired.

Therefore, it is desirable to have soft magnetic thin films with greater saturation magnetization ($4\pi M_s$) and greater anisotropy fields ($H_k$) than conventional soft magnetic thin films.

SUMMARY OF THE INVENTION

The invention is embodied in anisotropic, soft magnetic thin films comprising a cobalt-iron-chromium-nitrogen (Co—Fe—Cr—N) alloy and methods for making them. The thin films are formed such that the alloy has a relatively high saturation magnetization ($4\pi M_s$), e.g., greater than approximately 8 kilogauss (kG), a relatively low coercivity ($H_c$), e.g., less than approximately 2.0 oersteds (Oe), a relatively high squareness ratio ($M_r/M_s$), e.g., greater than approximately 0.90, and a relatively high anisotropy field ($H_k$), e.g., greater than approximately 20 Oe. The soft magnetic properties are obtained in an as-deposited condition or, alternatively, with a relatively low temperature treatment, e.g., below approximately 300° Celsius. Thin films according to embodiments of the invention are suitable for use, e.g., in electromagnetic devices such as in microtransformer cores, inductor cores and in magnetic read-write heads.

It is to be understood that the drawings are to illustrate the concepts of the invention and are not to scale.

DETAILED DESCRIPTION

Figure 1:
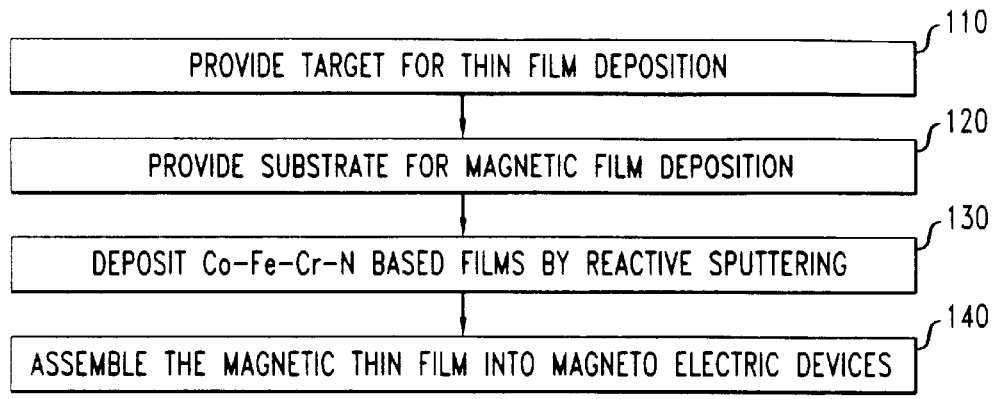
FIG. 1 is a simplified block diagram of a method for making soft magnetic thin films comprising Co—Fe—Cr—N according to embodiments of the invention.

FIG. 1 is a simplified block diagram of a method for making soft magnetic thin films comprising cobalt-iron-chromium-nitrogen (Co—Fe—Cr—N) in accordance with embodiments of the invention. A first step 110 is to provide an alloy target or targets from which the inventive magnetic thin films are to be deposited, e.g., by chemical or physical deposition such as by sputtering, evaporation, molecular beam epitaxial growth, ion beam deposition and laser ablation.

For example, deposition by sputtering is amenable to large-scale industrial manufacturing. The sputtering target (shown as 210 in FIG. 2a), which typically is in the form of a round plate, in one embodiment, has an alloy composition similar to the desired film composition and, in another embodiment, has composite sections of different metals or alloys on the target surface to be sputtered away. Alternatively, the film deposition is accomplished by using multiple targets, e.g., by co-sputtering from two or more targets with different compositions chosen so that the final composition of the deposited film on the substrate corresponds to the desired composition. For example, as will be discussed in greater detail hereinbelow, in data shown in FIG. 6, co-sputtering with two targets was used, e.g., a Co-9.6%Fe-4.4%Cr (in weight %) target on one side and a Fe-4.5%Cr target on the other side separated by approximately 6 inches.

According to one embodiment of the invention, diode sputtering or triode sputtering is used for deposition of the inventive films. Triode sputtering often is used instead of diode sputtering because triode sputtering uses lower bias voltage and lower argon (Ar) pressure, thus allowing easier control of the sputter deposition and the formation of desired nanocrystalline microstructure in the inventive soft magnetic films comprising Co—Fe—Cr—N.

According to another embodiment of the invention, nitrogen (N) is incorporated into the alloy film by reactive deposition, i.e., by continuously supplying a specific partial pressure of nitrogen gas in the background Ar gas carrier during the sputtering process. The nitrogen atoms are believed to go into the thin film structure both by reaction with one or more of the metallic elements in the form of a nitride, such as Cr-nitride or Fe-nitride, and/or by dissolution in the form of interstitial solute atoms in the alloy crystal lattice.

According to another embodiment of the invention, nitrogen is supplied by alloying it directly into the sputtering targets or by adding it to the films after deposition, e.g., by ion implantation. Accordingly, thin films of inventive alloys, prepared by any suitable technique, are subjected to nitrogen implantation with appropriate doses and processing temperatures.

In the case of using a single alloy target for sputtering, the composition of the target according to embodiments of the invention is, e.g., cobalt (Co) within the range from approximately 10–90 weight %, typically within the range from approximately 20–80 weight %, more typically within the range from approximately 30–60 weight %, iron (Fe) within the range from approximately 10–90 weight %, typically within the range from approximately 20–80 weight %, more typically within the range from approximately 30–60 weight %, chromium (Cr) in the range from approximately 0–15 weight %, typically within the range from approximately 1.0–12.0 weight % and more typically within the range from approximately 1.5–8.0 weight %. If nitrogen (N) is to be added to the sputtering target, the alloy target includes nitrogen within the range from approximately 0–10 weight %, depending on the concentration of the nitrogen gas used during the sputtering.

The next step 120 is to provide a substrate onto which one or more soft magnetic films according to embodiments of the invention are to be deposited. A clean and smooth non-magnetic substrate surface is desired, e.g., for microtransformer-type applications. Substrate materials include, e.g., semiconductors such as silicon (Si) and gallium-arsenide (Ga—As), and other materials such as glass, quartz, ceramic, polymer and polyimide. A silicon substrate is convenient if other semiconductor electronic integrated circuit (IC) circuitry and interconnection features are to be integrated on portions of the same substrate. The IC circuits are fabricated, e.g., either before or after the deposition of the soft magnetic films.

For use in microtransformer or inductor applications, especially for high-frequency devices (e.g., f=1–1000 megahertz or greater), Co—Fe—Cr—N thin films according to embodiments of the invention are formed, e.g., into a multilayer, patterned Configuration with dielectric spacer layers, such as spin-coated or spray-coated and optionally photolithographically patterned polyimide films, interleaved therebetween. Alternatively, the thin films are formed by vacuum or CVD deposition of dielectric films such as aluminum oxide ($Al_2O_3$), aluminum nitride (AlN), silicon dioxide ($SiO_2$) and yttrium oxide ($Y_2O_3$). The multilayer configuration of magnetic thin films according to embodiments of the invention provides high electrical resistance for the film layers so as to reduce eddy current loss, e.g., during high-frequency operation.

In such multilayer arrangement, typically more than one substrate material is involved. For example, after depositing the first magnetic layer comprising Co—Fe—Cr—N on, e.g., a silicon (Si) substrate, a polyimide insulation layer is deposited on the first magnetic layer and thus becomes the next substrate for the remaining magnetic layers. Also, because the magnetic properties of alloys and compounds often are influenced by crystallographic texture and lattice parameters, it is possible to choose the substrate material to provide epitaxial growth with accompanying lattice parameter modifications, to induce growth texture (such as a columnar structure) or to induce desired degrees of crystallization.

The next step 130 is to deposit thin films comprising Co—Fe—Cr—N, e.g., by reactive sputtering in a nitrogen-containing atmosphere. According to embodiments of the invention, the amount of nitrogen used is within the range from approximately 0.2–30.0% in volume in argon (Ar), and often within the range from approximately 0.5–10.0% in volume with a total (Ar+$N_2$) gas pressure of approximately $10^{-2}$ to $10^{-4}$ Torr. The sputtering target(s) are subjected to a bias voltage in the range from approximately 20–500 volts, typically within the range from approximately 50–200 volts.

For microtransformer or inductor applications involving multilayer deposition and temperature-sensitive dielectric spacer layers such as polyimide, the substrate temperature typically is kept at or near ambient temperature. Alternatively, the substrate temperature is kept below approximately 150° Celsius (a temperature above which many polymers or polyimides begin to suffer damage with undesirable chemical or structural changes). For other device applications in which temperature-degradable materials are not involved, higher substrate temperatures generally are used.

Other embodiments of the present invention use one or more magnetic fields during the deposition of the films comprising Co—Fe—Cr—N to induce magnetic anisotropy in the desired direction. Since the inventive films have soft magnetic properties, a relatively low field is applied to introduce preferential ordering of atoms to form an easy direction of magnetization for higher permeability, lower coercivity ($H_c$), and a more square magnetic hysteresis (M-H) loop shape. The magnitude of the applied field is within the range from approximately 2–5000 oersteds (Oe), typically within the range from approximately 10–500 Oe. Since the deposition temperature for the inventive films often is near ambient temperature, the magnetic fields are applied conveniently, e.g., by placing one or more electromagnets or permanent magnets near the substrate. Such is done without fear of solenoid wire insulation damage or loss of magnetism in permanent magnets upon heating toward or above the Curie temperature.

Figure 2A:
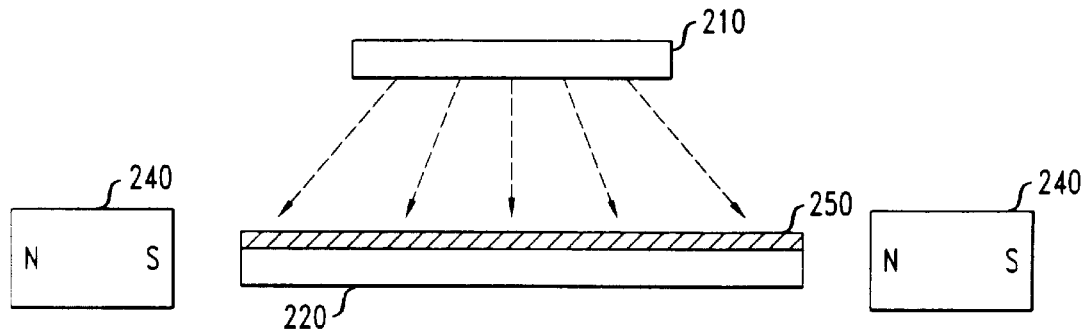
FIGS. 2a–b are diagrams showing various configurations of depositing thin films in the presence of an applied magnetic field according to embodiments of the invention.
Figure 2B:
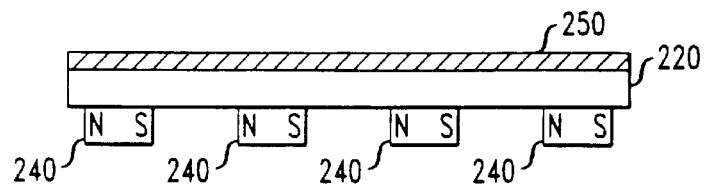

In the case of magnetron sputtering, the stray magnet field itself in the deposition system is used conveniently to induce anisotropy. As shown in FIGS. 2a–b, if an additional field is to be applied, one or more permanent magnets is used because of the relative simplicity of placing magnets either on the sides of or beneath substrate 220 during the deposition. Various permanent magnets 240 are acceptable, including those made of relatively high coercivity materials samarium-cobalt (Sm—Co), neodymium—iron— boron (Nd—Fe—B), barium-ferrite and iron-chromium-cobalt (Fe—Cr—Co), all of which reduce self-demagnetization in small or short magnet configurations. Multiple magnet arrays, such as shown in FIG. 2b, generally provide a stronger field to the substrate regions between the magnets than, e.g., the magnet arrangement shown in FIG. 2a. If a relatively uniform in-plane field is desirable over the substrate area, it is possible to replace the small magnets shown in FIG. 2a with a single magnet having a size comparable to that of the substrate.

In the case of multilayer deposition, the thickness of the layers comprising Co—Fe—Cr—N are within the range, e.g., from approximately 0.001–10.0 microns, typically within the range from approximately 0.01–2.0 microns. Higher frequency operations generally require thinner magnetic films to reduce eddy current loss. The insulating (dielectric) spacers, such as nitride or oxide ceramic films or plastic or polyimide films formed between the magnetic layers, typically are within the range from approximately 0.001–1.0 microns. The number of magnetic layers in use depends on the total amount of magnetic flux required and the thickness of each layer, but typically is between approximately 1–1000 layers.

The composition of the inventive films include, e.g., cobalt (Co) within the range from approximately 10–90 weight %, typically within the range from approximately 20–80 weight %, more typically within the range from approximately 30–60 weight %; iron (Fe) within the range from approximately 10–90 weight %, typically within the range from approximately 20–80 weight %, more typically within the range from approximately 30–60 weight % balance; chromium (Cr) within the range from approximately 0–15.0 weight %, typically within the range from approximately 1.0–12.0 weight %, and more typically within the range from approximately 1.5–8.0 weight %; and nitrogen (N) in the range from approximately 0.1–10 weight %, typically within the range from approximately 0.2–8 weight %, more typically in the range from approximately 0.3–5.0 weight %. Also, the inventive films may contain one or more impurity elements such as copper (Cu), nickel (Ni), tantalum (Ta), titanium (Ti), zirconium (Zr), hafnium (Hf), vanadium (V), molybdenum (Mo), niobium (Nb) and tungsten (W), cerium (Ce), yttrium (Y), lanthanum (La), carbon (C), aluminum (Al) and silicon (Si), with individual element amounts of less than approximately 1 weight % and typically less than approximately 0.5 weight %, and with total element amounts less than approximately 3 weight % and typically less than approximately 0.5 weight %.

Structurally, the inventive film includes a nanocrystalline or near-amorphous structure with an average crystallite size (grain-size), e.g., of less than approximately 1000 angstroms (Å), typically less than approximately 500 Å, and more typically less than approximately 200 Å. Also, the inventive film exhibits suitable soft magnetic properties in the as-deposited condition without having to undergo post-deposition heat treatment. For example, the coercivity ($H_c$) of the inventive films often is less than approximately 5 oersteds (Oe), and typically less than approximately 2 Oe. Also, the saturation ($4\pi M_s$) often is greater than approximately 12 kilogauss (kG), typically greater than approximately 15 kG, and more typically greater than approximately 18 kG.

The inventive films also exhibit squareness ratios ($M_r/M_s$), e.g., of at least approximately 0.90 and typically greater than approximately 0.95. Also, the anisotropy field ($H_k$) often is at least approximately 15 Oe, typically greater than approximately 30 Oe, and more typically greater than approximately 50 Oe.

Some of the processing and properties of the inventive films are described in the examples given below.

EXAMPLE 1

Figure 3A:
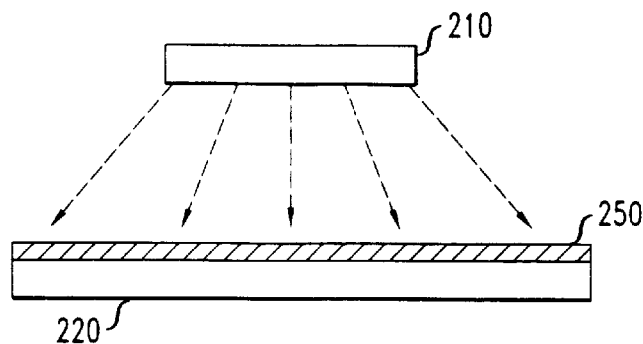
FIGS. 3a–c are diagrams showing various configurations of oblique angle thin film deposition in the absence of an applied magnetic field according to embodiments of the invention.
Figure 3B:
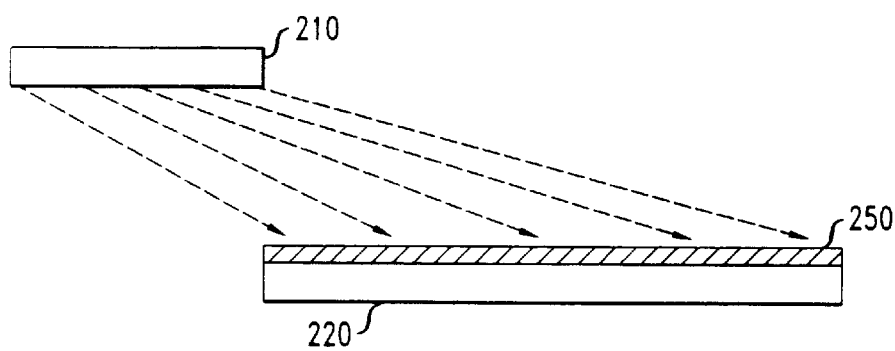
Figure 3C:
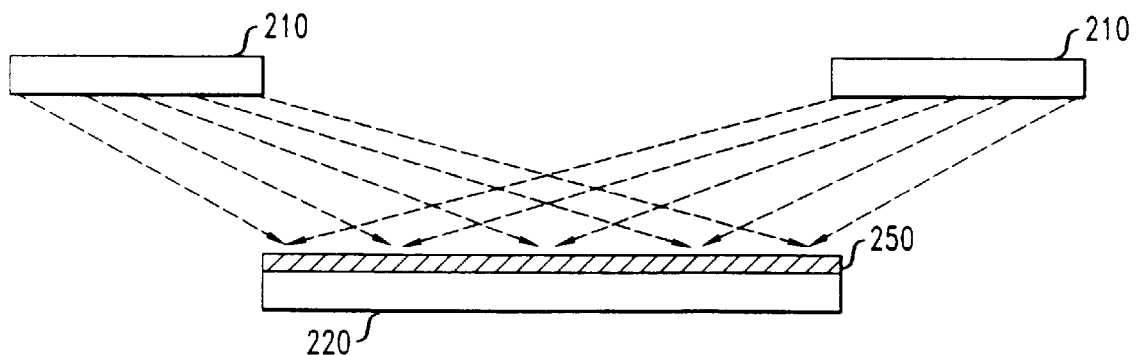

Thin films comprising the inventive Co—Fe—Cr—N alloy were deposited on 4 inch diameter (100) Si wafer substrates by triode DC magnetron sputtering, using the co-sputtering process illustrated generally in FIG. 3c, with two 2.25 inch diameter targets having approximate compositions of 86%Co-9.5%Fe-4.5%Cr (in weight %) and 95.5%Fe-4.5%Cr, respectively, and using a reactive process in a nitrogen-containing atmosphere. The sputtering chamber first was pumped down to approximately $2\times10^{-7}$ Torr, and then the reactive sputtering was performed under a gas atmosphere with an initial pressure ($Ar+N_2$) of approximately $5\times10^{-3}$ Torr and a gas flow rate of approximately 50 cubic centimeters per minute. The amount of nitrogen in the argon gas was approximately 2.5% in volume, which resulted in a nitrogen content in the deposited film of approximately 0.6 weight %. A bias voltage of approximately 140 volts was applied to both targets. The Si substrate was kept at ambient temperature during sputtering. The rate of sputter deposition was approximately 100 Å per minute. The films were approximately 1000 Å thick.

The magnetic hysteresis (M-H) loops were measured using a Vibrating Sample Magnetomer (VSM). The M-H loops were measured as a function of the in-plane orientation to determine the direction of easy and hard magnetization. Because the co-sputtering process targets are placed approximately 6 inches apart, the deposited Co—Fe—Cr—N films have a concentration gradient from one end to the other (e.g., from the Co-rich end to the Fe-rich end). Small samples, each approximately 0.125 inch square, were cut from various locations of the substrate to represent a spectrum of the gradient composition. Table 1 shows the easy-axis magnetic properties of some selected samples cut from the Si wafer. The approximate compositions also are given in the table.

TABLE 1

Magnetic Properties of Co-Sputtered Co—Fe—Cr—N Films in the As-Deposited Condition

| Composition (wt %) | | | | $4\pi M_s$ | Squareness | $H_c$ | $H_k$ |
|---|---|---|---|---|---|---|---|
| Co | Fe | Cr | N | (kilogauss) | ($M_r/M_s$) | (Oe) | (Oe) |
| 83.6 | 10.6 | 4.5 | 1.3 | 14.8 | 0.98 | 6.6 | 32 |
| 54.0 | 40.2 | 4.5 | 1.3 | 16.2 | 0.98 | 2.9 | 80 |
| 42.7 | 51.5 | 4.5 | 1.3 | 19.3 | 0.99 | 1.9 | 73 |
| 36.5 | 57.7 | 4.5 | 1.3 | 18.6 | 0.97 | 3.1 | 68 |
| 14.9 | 79.3 | 4.5 | 1.3 | 17.2 | 0.95 | 3.2 | 72 |
| 2.7 | 91.5 | 4.5 | 1.3 | 16.2 | 0.97 | 2.7 | 57 |

As is evident from Table 1, thin films according to embodiments of the invention exhibit, in the as-deposited condition, advantageous soft magnetic properties with relatively square M-H loops, high saturation magnetization ($4\pi M_s$), low coercivity ($H_c$) and high anisotropy fields ($H_k$). Of particular interest is the thin film with an estimated composition of approximately 42.7%Co-51.5%Fe-4.5%Cr-1.3%N in weight %.

EXAMPLE 2

A thin film comprising the inventive Co—Fe—Cr—N alloy, e.g., with a composition of 49.7%Co-44.5%Fe-4.5Cr-1.3%N (in weight %) was deposited on a silicon (Si) substrate from a single alloy target by triode magnetron sputtering. The nitrogen content in the argon gas was approximately 2.5% in volume. The mixed gas was blown directly onto the substrate at a distance of approximately 1 inch. A bias voltage of approximately 140 volts was applied to the single alloy target. The substrate was kept at ambient temperature. The rate of deposition was approximately 100 Å per minute. The film thickness was approximately 1000 Å.

Figure 4:
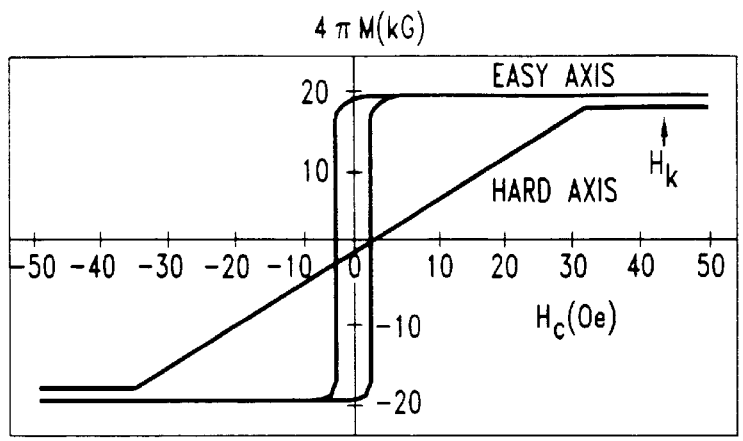
FIG. 4 is a graphical diagram of the magnetic hysteresis (M-H) loops along the easy and hard-axis direction of magnetization of as-deposited Co—Fe—Cr—N alloy films according to embodiments of the invention.

Referring now to FIG. 4, magnetic hysteresis (M-H) loops along the in-plane easy-axis and the hard-axis of the thin film are shown. The easy-axis M-H loop exhibits advantageous soft magnetic properties of the film in the as-deposited condition. For example, such advantageous properties include a relatively high saturation magnetization ($4\pi M_s$) of approximately 19 kG, a relatively low coercivity ($H_c$) of approximately 0.87 Oe, and a relatively high squareness ratio ($M_r/M_s$) of approximately 0.98. The hard-axis loop, obtained in a 90° rotated direction, exhibits an advantageously closed loop and an anisotropy field ($H_k$) of approximately 35 Oe. The ferromagnetic resonance (FMR) frequency is estimated to be approximately 2.2 gigahertz (GHz).

It should be noted that the alloy films according to embodiments of the invention have relatively well-defined easy-axis and hard-axis orientations, typically both in-plane and approximately 90 degrees apart. For minimal power loss in high-frequency applications, it is advantageous to have the hard-axis loop as closed as possible and with a coercivity ($H_c$) along the hard-axis of less than approximately 5 Oe, typically less than approximately 2 Oe, and more typically less than approximately 1 Oe, and with the remanent induction as close to zero as possible, with a squareness ratio ($M_r/M_s$), typically less than approximately 0.1 and typically less than 0.02.

EXAMPLE 3

A film comprising the inventive Co—Fe—Cr—N alloy and having a thickness of approximately 1000 Å was deposited on a silicon (Si) substrate using a diode sputtering system. The target-to-substrate incident angle was tilted to be approximately 45 degrees. The nitrogen gas content in argon was at approximately 17 volume %. The mixed gas was fed into the deposition chamber with a distance to the substrate of approximately 6 inches. The resultant film in the as-deposited condition yielded advantageously highly anisotropic, magnetic properties, e.g., an anisotropy field ($H_k$) of approximately 230 Oe, a saturation magnetization ($4\pi M_s$) of approximately 10 kG, a squareness ratio ($M_r/M_s$) of approximately 0.97, and a coercivity ($H_c$) of approximately 18 Oe. The ferromagnetic resonance frequency of this film is estimated to be approximately 4.2 GHz.

It is evident from the Examples 1–3 described above that advantageously highly anisotropic, soft magnetic properties are obtainable in the as-deposited condition for films according to embodiments of the invention prepared by either co-sputtering or single alloy sputtering. Such combinations of relatively high saturation magnetization ($4\pi M_s$), low coercivity ($H_c$), high squareness ratios ($M_r/M_s$) and high anisotropy fields ($H_k$) are advantageous for use in many electromagnetic devices, such as in microtransformers, recording heads and high-frequency telecommunication devices.

The advantageous squareness ratio of the loop, the strong anisotropy and the unusually high anisotropy field values in films according to embodiments of the invention are believed to be the result of the inventive alloys and the unique processing procedures employed. The addition of chromium (Cr), especially in combination with oblique incident film deposition, appears to be advantageous in enhancing the magnetic anisotropy and electrical resistivity. Also, the presence of Cr is believed to help the formation of desirable nanocrystalline structure and microstructural texture for strong in-plane anisotropy fields. Such presence also is believed to improve soft magnetic properties, e.g., a lower coercivity ($H_c$), by reducing magnetocrystalline anisotropy or magnetostriction.

Furthermore, according to embodiments of the invention, increasing the angle of sputter deposition during the formation of the invention alloys advantageously improves their magnetic properties. For purposes of discussion herein, the terms "angle of sputter deposition" or "sputter deposition angle" or "deposition angle" are intended to include the angle at which the sputtered atoms arrive at and impinge on the substrate.

Figure 5:
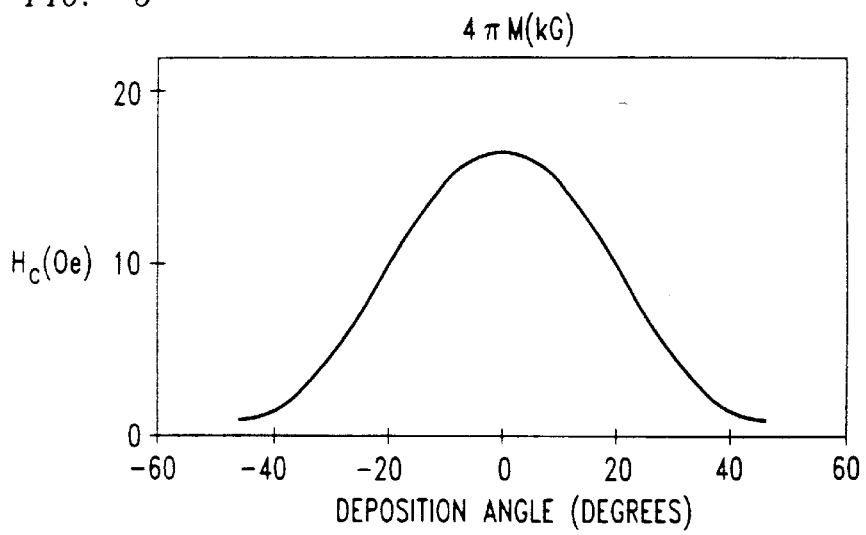
FIG. 5 is a graphical diagram illustrating magnetic coercivity, $H_c$, as a function of film deposition angle for Co—Fe—Cr—N films according to an embodiments of the invention.

For example, FIG. 3 illustrates various deposition angle configurations according to embodiments of the invention. In FIG. 3a, a target 210 is centered above a substrate 220. In this configuration, the portion of a film 250 near the periphery of the substrate is deposited with a greater inclined angle than the portion of film 250 deposited near the center of the substrate. The angular difference affects the magnetic properties of the film, e.g., as shown in FIG. 5. The plot in FIG. 5 was derived from a film having a thickness of approximately 1000 Å, with a composition of Co-45%Fe-4.5%Cr-0.6%N (weight percent). For an angular difference of approximately 45 degrees, an advantageously low coercivity value ($H_c$) of approximately 2 Oe or less is achieved, while for an angular difference of approximately 0 degrees, a disadvantageously high coercivity value ($H_c$) of approximately 18 Oe occurs.

To keep a sufficiently high deposition angle, the target and the substrate should be laterally displaced, e.g., as shown in FIG. 3b. In the case of co-sputtering, two or more targets may be placed laterally away from the substrate position, e.g., as shown in FIG. 3c. According to embodiments of the invention, sputter deposition angles of at least approximately 10 degrees should be maintained. Alternatively, maintaining sputter deposition angles of at least approximately 20 degrees or even at least approximately 40 degrees are advantageous.

Figure 6:
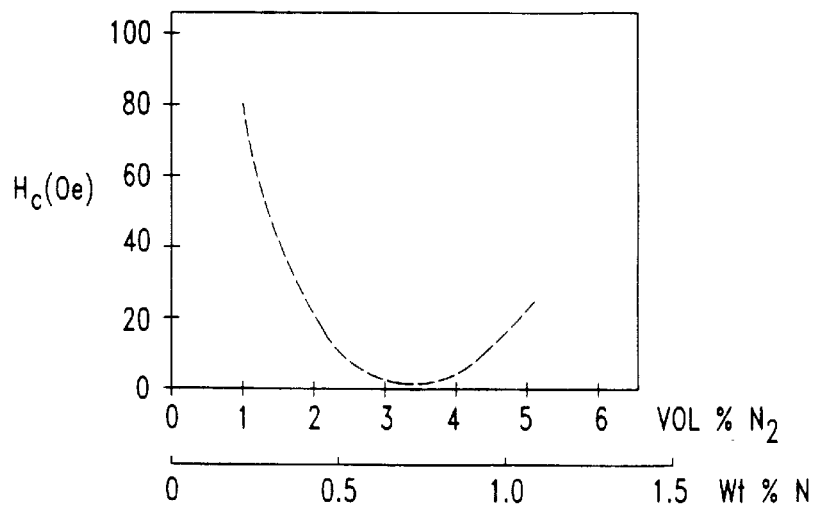
FIG. 6 is a graphical diagram of magnetic coercivity, $H_c$, as a function of nitrogen flow rate in an argon (Ar) carrier gas during a reactive sputtering process for Co—Fe—Cr—N alloy films according to embodiments of the invention.

Referring now to FIG. 6, the magnetic coercivity, $H_c$, of the inventive films comprising Co—Fe—Cr—N as a function of nitrogen content (in volume %) in the Ar gas sputtering atmosphere is shown. The coercivity value, $H_c$, of the films depends on the nitrogen content, with the lowest coercivity often being obtained by sputtering at a nitrogen gas content of approximately 2.5 volume %, which corresponds to approximately 0.6 weight % nitrogen atoms in the film. An insufficient nitrogen content is ineffective for preventing grain growth of the alloy matrix and results in an increased coercivity value. However, a nitrogen content too great (e.g., more than approximately 5 weight %) reduces the saturation magnetization ($4\pi M_s$) and also increases the coercivity. Thus, there appears to be a moderate, optimal range of nitrogen content for a given alloy composition.

The addition of Cr to a Co—Fe—N alloy film improves the soft magnetic properties of the film. Such improvements include, e.g., a lower coercivity ($H_c$), a more square magnetic hysteresis (M-H) loop, and a higher anisotropy field ($H_k$) in the as-deposited condition. Also, such additions reduce or eliminate the need for post-deposition heat-treatment.

According to an alternative embodiment of the invention, the inventive films are given a low-temperature heat treatment to further improve the soft magnetic properties. To reduce the damage to insulating layers such as polyimide, heat treatment temperatures below approximately 300° Celsius and typically below approximately 150° Celsius are used. Also, to reduce surface oxidation during the heat treatment, a vacuum atmosphere of greater than approximately $10^{-4}$ Torr is used. However, a vacuum atmosphere less than approximately $10^{-4}$ Torr is used, e.g., if the top surface of the film is protected by oxidation-resistant coatings such as Cr, Al, oxide, or nitride films.

According to another embodiment of the invention, the inventive films are formed as a composite structure with a different type of magnetic layer. For example, the composite structure has one or more exchange bias films made of, e.g., one or more antiferromagnetic, ferromagnetic or ferrimagnetic materials, that are added directly on the surface of the soft magnetic film. For example, a thin film of Fe-50% manganese antiferromagnetic alloy is added onto some or all of the soft magnetic layers comprising Co—Fe—Cr—N to shift the magnetic hysteresis (M-H) loop by more than the coercivity of the soft magnetic film (i.e., by at least approximately 2 Oe). Also, the thin film of Fe-50% manganese antiferromagnetic alloy is added to allow for high-frequency operation (e.g., approximately 0.1–10 GHz) of the soft magnetic films in the internal bias-field mode with minimal magnetic domain wall motion.

Some of the inventive Co—Fe—Cr—N films exhibit highly square, easy-axis loop characteristics in combination with closed, hard-axis loop shapes and relatively high, easy-axis coercivity, e.g., greater than approximately 10–30 Oe. Such high coercivity is desirable in operations that are free of domain-wall motion because the high coercivity provides the stability of easy-axis saturation against stray fields and thus makes it unnecessary to add anitiferromagnetic bias films.

The last step 140 in FIG. 1 is to assemble the magnetic thin film within electromagnetic devices such as microtransformers, saturable transformers, inductors and recording heads. Step 140 comprises appropriately sizing the substrate (which contains a deposited and optionally patterned single layer, multilayer or composite-structured magnetic film), adding appropriate interconnection and conductor circuitry if needed, and assembling the film within the electromagnetic devices.

Figure 7A:
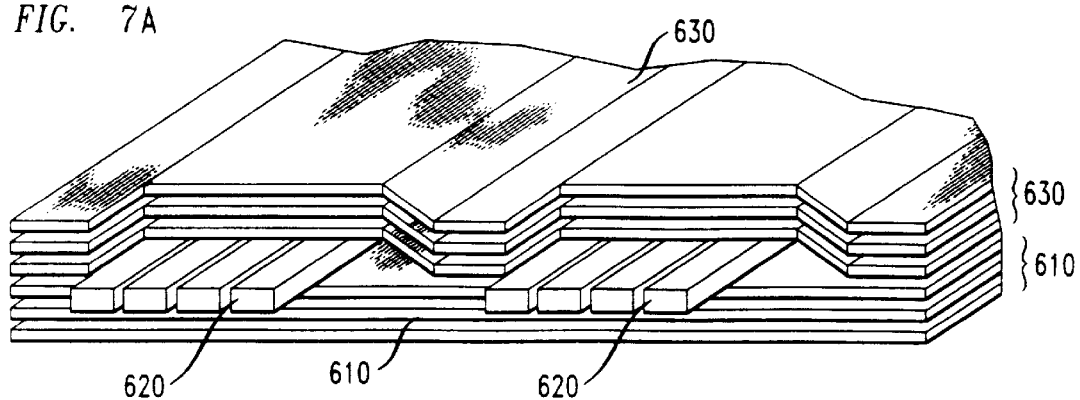
FIGS. 7a–b are perspective and top views, respectively, of a pot-core type microtransformer comprising Co—Fe—Cr—N films according to embodiments of the invention.
Figure 7B:
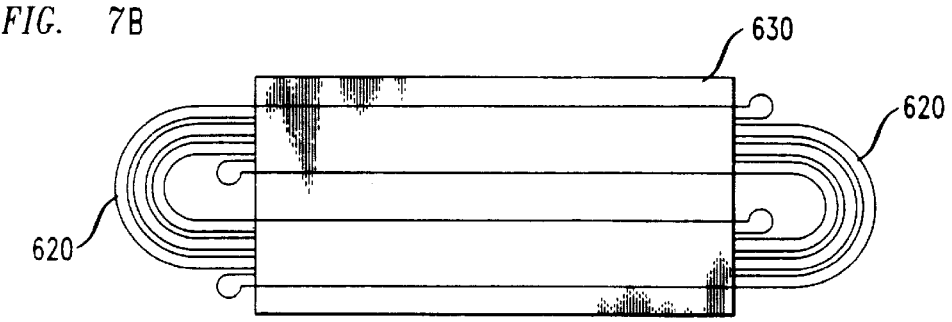

Referring now to FIGS. 7a–b, various views of a pot-core type microtransformer comprising the inventive films comprising Co—Fe—Cr—N are shown. To form such transformer, a multiplicity of soft magnetic film layers 610 (laminations with polyimide or other insulating layers there between) first is deposited, then a patterned conductor layer 620 (e.g., containing Cu lines) is added above magnetic film layers 610, and then more magnetic film laminations 630 are deposited, as shown.

Figure 8A:
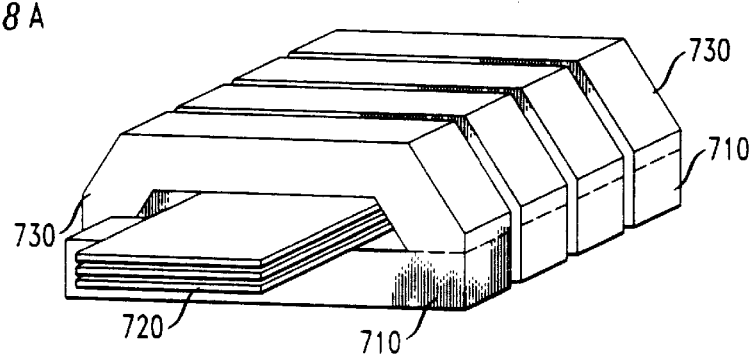
FIGS. 8a–b are perspective and top views, respectively, of a toroid type microtransformer comprising Co—Fe—Cr—N films according to embodiments of the invention.
Figure 8B:
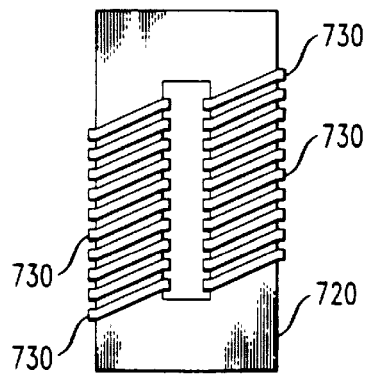

FIGS. 8a–b show various views of a toroidal microtransformer according to an embodiment of the invention. Here, a conductor layer 710 in the form of parallel segments first is prepared, then a magnetic film lamination 720 comprising Co—Fe—Cr—N is deposited thereon, and then a top conductor layer 730 in the form of parallel segments is added for connection with segments of conductor layer 710 to form the toroidal winding configuration as shown.

For certain applications, films comprising Co—Fe—Cr—N are deposited in such a way that the easy-axis of magnetization coincides with the direction of the applied field from the windings. For very high-frequency applications (e.g., frequencies of approximately 10 MHz or greater), magnetization switching by domain wall motion typically is not desired and hence the magnetically hard direction is used so that coherent spin rotation mode is operational.

For this reason, in-plane uniaxial magnetic anisotropy and the accompanying square magnetic hysteresis (M-H) loop shape typically is used. The uniaxial anisotropy, which is induced, e.g., by thin film deposition in the presence of magnetic fields, is defined, e.g., in terms of the anisotropy field ($H_k$), which is represented by the field in which the hard-axis magnetization loop reaches saturation. See, for example, FIG. 4, which is discussed hereinabove.

According to embodiments of the invention, anisotropy fields ($H_k$) in the inventive films are advantageously high, e.g., in the range from approximately 15–200 Oe and typically in the range from approximately 30–100 Oe. However, too high of an anisotropy field, e.g., greater than approximately 500 Oe, reduces the high-frequency permeability, which is proportional to the saturation magnetization divided by the anisotropy field value ($4\pi M_s/H_k$) in the hard-axis operation. Also, too low of an anisotropy field, e.g., less than approximately 10 Oe, causes the ferromagnetic resonance frequency to be reduced and to interfere with operating frequency ranges. Therefore, too much magnetic softness (i.e., a very low anisotropy value) typically is disadvantageous for high-frequency operation of devices comprising the inventive films.

A relatively high "squareness" of the magnetic hysteresis (M-H) loop in the easy-axis direction is advantageous for high-frequency applications (e.g., greater than 0.5 GHz), as devices comprising the inventive films advantageously are saturated essentially into a single domain state along the easy-axis, and then are operated in a high-frequency alternating current (AC) mode in the hard-axis direction to reduce or minimize the domain wall motion. In this manner, devices with the inventive films comprising Co—Fe—Cr—N have a "squareness" (as defined by the ratio of the remanent magnetization, $M_r$, to the saturation magnetization, $M_s$) of at least 0.90 and typically at least 0.95.

Figure 9A:
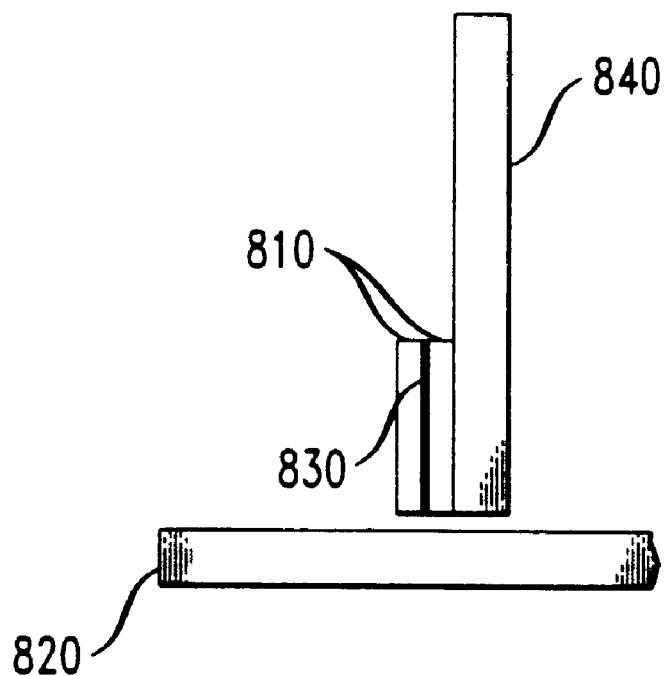
FIGS. 9a–b are side, cross-sectional views of a magnetic recording head comprising Co—Fe—Cr—N films according to embodiments of the invention.
Figure 9B:
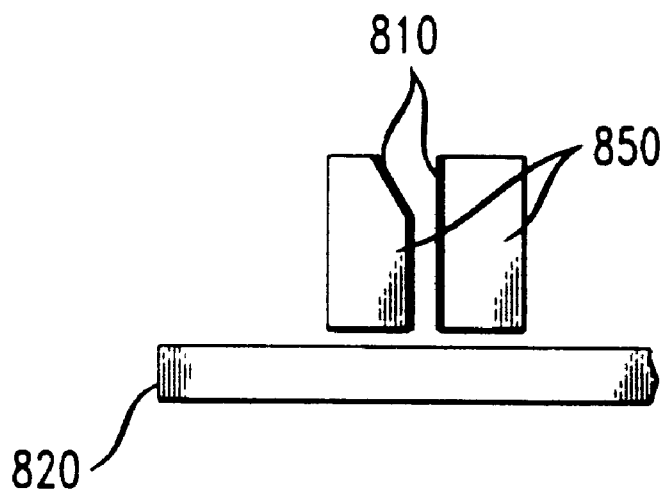

FIGS. 9a–b show cross-sectional views of electromagnetic devices having embodiments of the invention incorporated therein. A cross-sectional view of a recording read-write head comprising an embodiment of the inventive film is illustrated in FIG. 9a. The soft magnetic film 810 serves to amplify the magnetic signal from the recorded magnetic memory bit information in the magnetic disk or tape 820 such that the inductive sense coil or magnetoresistive sensor 830 generates a higher output signal. Shown also is the substrate 840 upon which soft magnetic film 810 is formed.

Alternatively, as shown in FIG. 9b, the inventive film is used as the high-magnetization material in the metal-in-gap (MIG) type head configuration. In this embodiment, the head 850 is made of, e.g., ferrite.

It will be apparent to those skilled in the art that many changes and substitutions can be made to the thin films and their incorporation into the electromagnetic devices herein described without departing from the spirit and scope of the invention as defined by the appended claims.

What is claimed is:

1. An article, comprising:
    a non-magnetic substrate; and
    an anisotropic, magnetically soft film supported by said substrate, said film including an alloy of cobalt-iron-chromium-nitrogen (Co—Fe—Cr—N) and having a saturation magnetization ($4\pi M_s$) of at least approximately 8 kilogauss (kG), an anisotropy field ($H_k$) within the range from approximately 15 to 300 oersteds (Oe) and a magnetic hysteresis (M-H) loop squareness ratio (remanent magnetization, $M_r$, to saturation magnetization, $M_s$) of at least approximately 0.90, wherein said alloy contains, by atomic percentage, at least approximately 15% cobalt (Co), and wherein said article has been heat treated at a temperature of no more than approximately 150° Celsius.

2. The article as recited in claim 1, wherein said film has an anisotropy field ($H_k$) greater than approximately 50 Oe, and has a ferromagnetic resonance (FMR) frequency greater than approximately 1 gigahertz (GHz).

3. The article as recited in claim 1, wherein said Co—Fe—Cr—N alloy includes chromium (Cr) within the range from approximately 0 to 15 weight %.

4. The article as recited in claim 1, wherein said Co—Fe—Cr—N alloy contains cobalt (Co) within the range from approximately 20 to 80 weight %, iron (Fe) within the range from approximately 20 to 80 weight %, chromium (Cr) within the range from approximately 1 to 12 weight %, and nitrogen (N) within the range from approximately 0.2 to 8.0 weight %.

5. The article as recited in claim 1, wherein said film further comprises a plurality of thin film layers and wherein said article further comprises a corresponding plurality of dielectric spacer layers formed between said thin film layers in such a way that a multilayer structure is formed.

6. The article as recited in claim 5, wherein said plurality of dielectric spacer layers further comprises polyimide or ceramic insulators.

7. The article as recited in claim 1, wherein said film is formed on said substrate in such a way that the average grain structure size of said film is less than approximately 500 angstroms (Å).

8. The article as recited in claim 1, further comprising one or more exchange bias films formed on said film, said exchange bias films selected from a group consisting of antiferromagnetic, ferromagnetic and ferrimagnetic material.

9. The article as recited in claim 1, wherein said article is part of an electromagnetic device selected from a group consisting of a microtransformer, an inductor and a magnetic read-write head.

10. The article as recited in claim 1, wherein said article is for use at an operating frequency of at least approximately 10 megahertz (MHz), and wherein said film is saturated along an easy-axis of magnetization into a single domain state and then operated in an alternating current (AC) field along a hard-axis of magnetization.

11. The article as recited in claim 1, wherein said film has an easy-axis coercive force of at least approximately 30 oersteds (Oe).

12. A method for making a magnetically soft thin film article, said method comprising the steps of:
    providing a non-magnetic substrate; and
    depositing at least one anisotropic, magnetically soft thin film in such a way that said non-magnetic substrate supports said film, said film including an alloy of cobalt-iron-chromium-nitrogen (Co—Fe—Cr—N) and having a saturation magnetization ($4\pi M_s$) of at least approximately 8 kilogauss (kG), an anisotropy field ($H_k$) within the range from approximately 15 to 300 oersteds (Oe) and a magnetic hysteresis (M-H) loop squareness ratio (remanent magnetization, $M_r$, to saturation magnetization, $M_s$) of at least approximately 0.90, wherein said alloy contains, by atomic percentage, at least approximately 15% cobalt (Co), and wherein said article has been heat treated at a temperature of no more than approximately 150° Celsius.

13. The method as recited in claim 12, wherein said Co—Fe—Cr—N alloy includes chromium (Cr) within the range from approximately 0 to 15 weight %.

14. The method as recited in claim 12, wherein the Co—Fe—Cr—N alloy contains cobalt (Co) within the range from approximately 30 to 60 weight %, iron (Fe) within the range from approximately 30 to 60 weight %, chromium (Cr) within the range from approximately 1 to 12 weight %, and nitrogen (N) within the range from approximately 0.7 to 5.0 weight %.

15. The method as recited in claim 12, wherein said depositing step is selected from the group consisting of sputtering, evaporation, molecular beam epitaxial growth, ion beam deposition and laser ablation.

16. The method as recited in claim 12, wherein said forming step further comprises depositing the elements of said alloy without nitrogen on said substrate, and then adding nitrogen to said alloy by ion implantation.

17. The method as recited in claim 12, wherein said forming step further comprises sputter-depositing said magnetically soft thin film on said substrate with a deposition angle of at least approximately 10 degrees.

18. The method as recited in claim 12, wherein said forming step further comprises sputter-depositing said magnetically soft thin film on said substrate at ambient temperature and in the presence of an applied magnetic field having a strength greater than approximately 2.0 oersteds (Oe).

19. The method as recited in claim 12, further comprising, after said depositing step, the step of heat treating said magnetically soft thin film below a temperature of approximately 150° Celsius.

20. The method as recited in claim 12, wherein said depositing step further comprises depositing a plurality of magnetically soft thin film layers interleaved with corresponding plurality of dielectric spacer layers.

21. The method as recited in claim 12, further comprising the step of incorporating said magnetically soft thin film into an electromagnetic device selected from the group consisting of a microtransformer core, an inductor core, and a magnetic read-write head.

* * * * *